(12) United States Patent
Larson

(10) Patent No.: US 11,376,102 B2
(45) Date of Patent: *Jul. 5, 2022

(54) ORTHODONTIC BRACKET

(71) Applicant: Robert G. Larson, Carmel, IN (US)

(72) Inventor: Robert G. Larson, Carmel, IN (US)

( * ) Notice: Subject to any disclaimer, the term of this patent is extended or adjusted under 35 U.S.C. 154(b) by 289 days.

This patent is subject to a terminal disclaimer.

(21) Appl. No.: 16/735,872

(22) Filed: Jan. 7, 2020

(65) Prior Publication Data

US 2020/0138550 A1 May 7, 2020

Related U.S. Application Data

(63) Continuation-in-part of application No. 15/805,795, filed on Nov. 7, 2017, now Pat. No. 10,524,883.

(60) Provisional application No. 62/419,417, filed on Nov. 8, 2016.

(51) Int. Cl.
*A61C 7/14* (2006.01)

(52) U.S. Cl.
CPC .................. *A61C 7/141* (2013.01)

(58) Field of Classification Search
CPC ............... A61C 7/12; A61C 7/14; A61C 7/16
See application file for complete search history.

(56) References Cited

U.S. PATENT DOCUMENTS

| | | | |
|---|---|---|---|
| 2,908,974 A * | 10/1959 | Stifter | A61C 7/12 433/16 |
| 3,193,930 A * | 7/1965 | Bien | A61C 7/143 433/15 |
| 3,423,833 A | 1/1969 | Pearlman | |
| 3,464,112 A | 9/1969 | Silverman et al. | |
| 3,721,005 A | 3/1973 | Cohen | |
| 3,765,091 A | 10/1973 | Northcutt | |
| 3,959,880 A | 6/1976 | Andrews | |
| 4,077,126 A | 3/1978 | Pletcher | |
| 4,139,945 A | 2/1979 | DiGiulio | |
| 4,337,037 A | 6/1982 | Kurz | |
| 4,531,911 A | 7/1985 | Creekmore | |
| 4,597,739 A | 7/1986 | Rosenberg | |
| 4,614,497 A | 9/1986 | Kurz | |
| 4,659,309 A | 4/1987 | Merkel | |
| 4,867,678 A | 9/1989 | Parker | |
| 4,877,398 A | 10/1989 | Kesling | |
| 4,900,251 A | 2/1990 | Andreasen | |
| 4,927,360 A | 5/1990 | Pospisil | |
| 5,125,831 A | 6/1992 | Pospisil | |
| 5,161,969 A | 11/1992 | Pospisil et al. | |
| 5,248,257 A | 9/1993 | Cannon | |
| 5,299,934 A | 4/1994 | Suyama | |
| 5,320,525 A | 6/1994 | Forster | |
| 5,358,402 A | 10/1994 | Reed et al. | |
| 5,380,196 A | 1/1995 | Kelly et al. | |
| 5,380,197 A | 1/1995 | Hanson | |

(Continued)

*Primary Examiner* — Ralph A Lewis
(74) *Attorney, Agent, or Firm* — Barnes & Thornburg LLP

(57) ABSTRACT

An orthodontic bracket assembly may include a mounting plate configured to be coupled to a tooth. A bracket member may include a single tie-wing having a superior tie-wing portion, an inferior tie-wing portion, and a slot defined between planar side walls of the superior and inferior tie-wing portions. Each of the superior and inferior tie-wing portions may include a curved surface extending at a mesial end of the tie-wing portion and a distal end of the tie-wing portion.

17 Claims, 15 Drawing Sheets

(56) References Cited

U.S. PATENT DOCUMENTS

| | | |
|---|---|---|
| 5,542,842 A | 8/1996 | Andreiko et al. |
| 5,597,302 A | 1/1997 | Pospisil et al. |
| 5,618,175 A * | 4/1997 | Reher .................... A61C 7/141 433/16 |
| 5,630,716 A | 5/1997 | Hanson |
| 5,746,592 A | 5/1998 | Nezu et al. |
| 5,827,058 A | 10/1998 | Kelly et al. |
| 5,857,849 A | 1/1999 | Kurz |
| 6,071,119 A | 6/2000 | Christoff et al. |
| 6,193,350 B1 | 2/2001 | Hadley |
| 6,361,314 B1 | 3/2002 | Garton |
| 6,478,579 B1 | 11/2002 | Brusse |
| 6,554,612 B2 | 4/2003 | Georgakis et al. |
| 6,709,268 B2 | 3/2004 | Pospisil et al. |
| 7,140,875 B2 | 11/2006 | Lai et al. |
| 7,214,057 B2 | 5/2007 | Voudouris |
| 7,306,458 B1 | 12/2007 | Lu |
| 7,431,586 B1 | 10/2008 | Silverman |
| 7,621,743 B2 | 11/2009 | Bathen et al. |
| 7,963,768 B2 | 6/2011 | Hilliard |
| 9,198,740 B2 | 12/2015 | Damon et al. |
| 9,408,676 B2 | 8/2016 | Rahimi |
| 9,949,806 B2 | 4/2018 | Cosse et al. |
| 10,524,883 B2 * | 1/2020 | Larson .................... A61C 7/14 |
| 2006/0014116 A1 | 1/2006 | Maijer et al. |
| 2007/0166658 A1 | 7/2007 | Voudouris |
| 2010/0178629 A1 | 7/2010 | Oda et al. |

\* cited by examiner

ORTHODONTIC BRACKET

CROSS-REFERENCE TO RELATED APPLICATIONS

This application is a continuation in part application of U.S. patent application Ser. No. 15/805,795, filed Nov. 7, 2017, and entitled "ORTHODONTIC BRACKET," now U.S. Pat. No. 10,524,883, which claims priority to U.S. Provisional Patent Application Ser. No. 62/419,417, filed Nov. 8, 2016, and entitled "ORTHODONTIC BRACKET," wherein the complete disclosure of each are expressly incorporated by reference herein.

TECHNICAL FIELD

The present disclosure generally relates to structures for implementing orthodontia treatments. The present disclosure relates more specifically to an orthodontic bracket assembly configured to facilitate insertion of a wire thereon.

BACKGROUND

Orthodontic brackets are adhered to teeth. Each bracket has a slot therein that receives a wire, which extends between multiple teeth. The wire is used to exert force on the teeth to obtain movement thereof. The upper and lower walls of the slot are typically parallel and straight along their entire depth.

The parallel walls may make it difficult to place the wire into the slot, especially when the width of the wire is very close to the width of the slot, which is often the case. For example, when the parallel walls defining the slot have linear surfaces at the entrance of the slot, it can be difficult to insert the wire therein. Additionally, the configuration of such a bracket only allows for adjustment of the teeth through the force of the wire against the bracket, however, there is no ability to rotate or adjust the position of a portion of the bracket with conventional orthodontic brackets.

Therefore, there is a need for an orthodontic bracket, which allows for easier insertion and/or positioning of a wire within the slot of the bracket and also for a bracket, which may allow for additional adjustment(s) on the tooth.

SUMMARY

According to a first aspect of the disclosed embodiments, an orthodontic bracket assembly may include a mounting plate configured to be coupled to a tooth. A bracket member may include a single tie-wing having a superior tie-wing portion extending in a superior direction. An inferior tie-wing portion may extend in an inferior direction opposite to the superior direction. A slot may be defined between planar side walls of the superior and inferior tie-wing portions and configured to receive a wire. Each of the superior and inferior tie-wing portions may include a curved surface extending at a mesial end of the tie-wing portion and a distal end of the tie-wing portion and defining an entrance of the slot. A superior parabolic surface of the superior tie-wing portion may extend from the respective planar side wall in a superior direction. An inferior parabolic surface of the inferior tie-wing portion may extend from the respective planar side wall in an inferior direction.

In some embodiments of the first aspect, the superior parabolic surface and the inferior parabolic surface may each defined by the equation $y=ax^2+bx+c$. The superior parabolic surface may extend from the respective planar side wall to a superior apex. The inferior parabolic surface may extend from the respective planar side wall to an inferior apex. The superior apex and the inferior apex may have the same height in the buccal direction. A distance between the superior apex and the inferior apex may be approximately twice the distance between the planar side walls.

Optionally, in the first aspect, a support member may be positioned intermediate the mounting plate and the bracket member. The support member may include a plurality of tabs comprised of a flexible material and configured to contact the wire. A rear surface of the tabs may be configured to contact a forward surface of the mounting plate. A rear surface of the tabs may be spaced apart from a forward surface of the mounting plate. The support member may be removably coupled to the mounting plate and the bracket member may be removably coupled to the support member.

It may be desired in the first aspect that the slot is configured to move between a plurality of discrete positions. The superior and inferior tie-wing portions may be configured to receive a coupler extending between the superior and inferior tie-wing portions and positioned across a portion of the slot.

According to a second aspect of the disclosed embodiments, an orthodontic bracket assembly may include a mounting plate configured to be coupled with a tooth. The mounting plate may include a plurality of protrusions and a plurality of grooves positioned between adjacent protrusions. A support member may be rotatably coupled to the mounting plate and may include a pair of flexible tabs. Each tab may be configured to be selectively received in a groove. A bracket member may have a slot configured to receive a wire. The slot may be configured to move between a plurality of discrete angular positions relative to the mounting plate by selectively positioning each of the pair of tabs in opposing grooves. The bracket member may include a single tie-wing having a superior tie-wing portion extending in a superior direction. An inferior tie-wing portion may extend in an inferior direction opposite to the superior direction. The slot may be defined between planar side walls of the superior and inferior tie-wing portions. Each of the superior and inferior tie-wing portions may include a curved surface extending at a mesial end of the tie-wing portion and a distal end of the tie-wing portion and defining an entrance of the slot. A superior parabolic surface of the superior tie-wing portion may extend from the respective planar side wall in a superior direction. An inferior parabolic surface of the inferior tie-wing portion may extend from the respective planar side wall in an inferior direction.

In some embodiments of the second aspect, the superior parabolic surface and the inferior parabolic surface may each be defined by the equation $y=ax^2+bx+c$. The superior parabolic surface may extend from the respective planar side wall to a superior apex. The inferior parabolic surface may extend from the respective planar side wall to an inferior apex. The superior apex and the inferior apex may have the same height in the buccal direction. A distance between the superior apex and the inferior apex may be approximately twice the distance between the planar side walls.

Optionally, in the second aspect, the support member may be removably coupled to the mounting plate and the bracket member may be removably coupled to the support member. The superior and inferior tie-wing portions may be configured to receive a coupler extending between the superior and inferior tie-wing portions and positioned across a portion of the slot.

BRIEF DESCRIPTION OF THE DRAWINGS

The concepts described in the present disclosure are illustrated by way of example and not by way of limitation in the accompanying figures. Where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
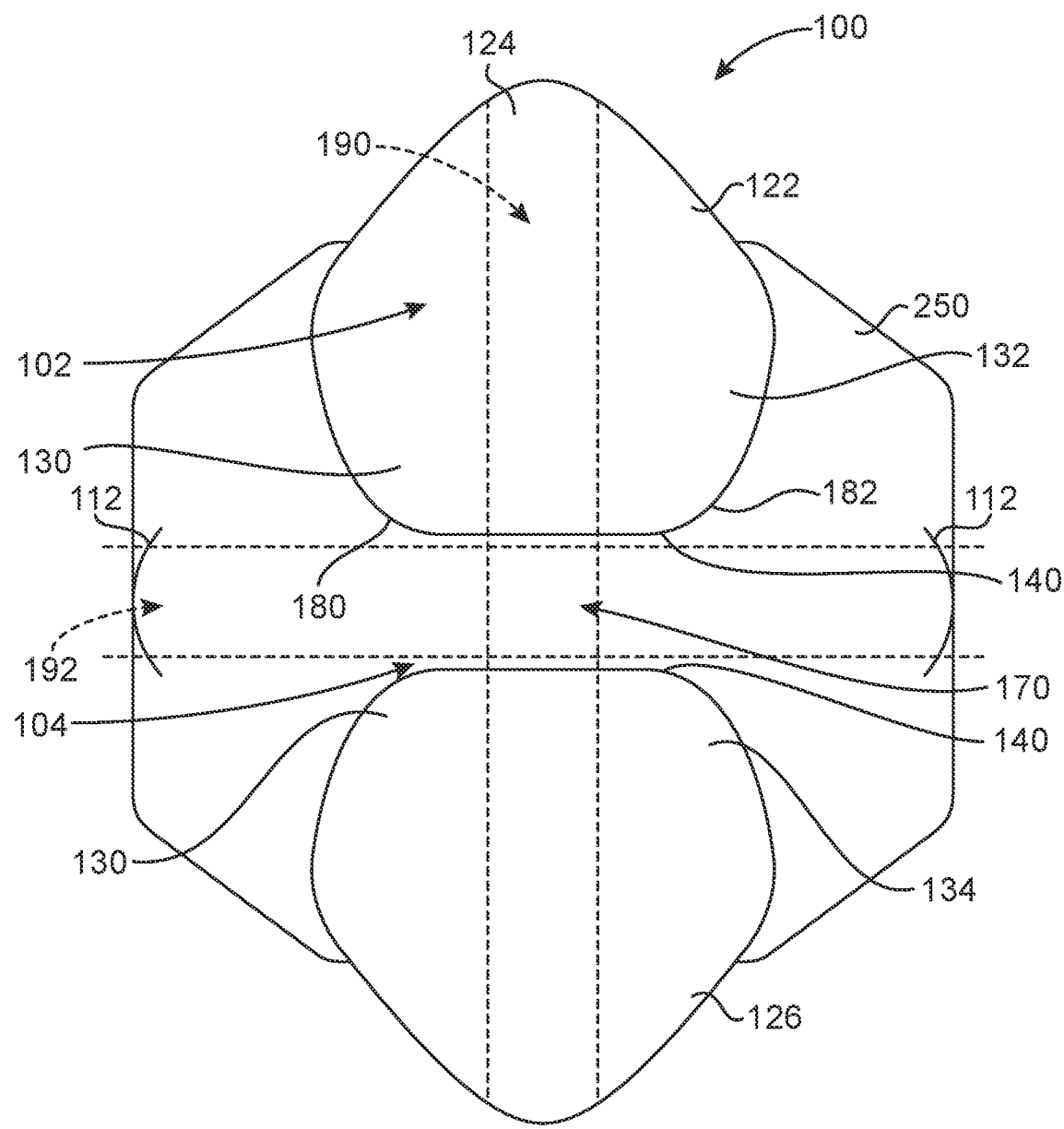
FIG. 1 is a front view of an illustrative orthodontic bracket assembly of the present disclosure, where the bracket assembly is at least partially comprised of a ceramic material.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The dental terms used herein are used in reference to an orthodontic bracket assembly being positioned on a tooth. "Mesial" means toward the dental midline. "Distal" means away from the dental midline. "Buccal" means toward the cheeks or lips. "Lingual" means toward the tongue. When the bracket is positioned on a top tooth, "superior" means toward the gum line, and "inferior" means toward the edge of the tooth. When the bracket is positioned on a bottom tooth, "inferior" means toward the gum line, and "superior" means toward the edge of the tooth. "Orthodontic arch wire" is a wire extending across the teeth posterior on one side across the anterior and back to posterior on the opposite side in the shape of an arch. The orthodontic arch wire is often rectangular in cross section. "Orthodontic bracket" is device fixed to each individual tooth to allow forces and vectors to affect individual teeth in precise movement.

Referring to FIGS. 1-4, an orthodontic bracket assembly 100 is configured to be positioned on a tooth. The orthodontic bracket assembly 100 includes a bracket member 102 removably coupled to a support member 104. The bracket member 102 and the support member 104 are formed from a ceramic material, in some embodiments. The support member 104 includes a base member 110 and a pair of tabs 112 that extend in the buccal direction from the base member 110. The bracket member 102 removably attaches to the support member 104 so that a base 120 of the bracket member 102 extends between the tabs 112.

A single tie-wing 122 extends in the buccal direction from the base 120. The tie-wing 122 includes a superior tie-wing portion 124 and an inferior tie-wing portion 126. The superior tie-wing portion 124 and the inferior tie-wing portion 126 are substantially identical, but face in opposite directions. Each tie-wing portion 124, 126 includes a parabolic surface 130. The parabolic surface 130 is defined by the equation $y=ax^2+bx+c$, where a, b, and c are rational numbers. The parabolic surface 132 of the superior tie-wing portion 124 extends in a superior direction and the parabolic surface 134 of the inferior tie-wing portion 126 extends in an inferior direction.

Each parabolic surface 130 extends from a respective planar side wall 140 to a point 142. The point 142 forms a flange 144 that extends in the lingual direction. An apex 146 of each parabolic surface 130 is positioned between the planar side wall 140 and the point 142. The apex 146 is positioned at a height 148 from the base 120. The height 148 is measured from the base 120 in the buccal direction. In the illustrated embodiment, the height 148 of an apex 160 of the superior tie-wing portion 124 is substantially the same as the height 148 of an apex 162 of the inferior tie-wing portion 126.

The planar side wall 170 of the superior tie-wing portion 124 and the planar side wall 172 of the inferior tie-wing portion 126 are substantially parallel and spaced apart to form a slot 174. The planar side walls 140 each extend between a mesial end 180 and a distal end 182. The mesial end 180 and the distal end 182 are rounded in the mesial-distal direction and curve toward the inferior-superior direction. In some embodiments, the mesial end 180 and the distal end 182 are parabolic. The slot 174 extends from the rounded mesial end 180 across the planar side wall 140 and extends to the rounded distal end 182.

The slot 174 is configured to receive an orthodontic arch wire 192. The parabolic surfaces 130 cooperate with the rounded mesial end 180 and rounded distal end 182 to guide the orthodontic arch wire 192 into the slot 174. With the orthodontic arch wire 192 positioned in the slot 174, the superior and inferior tie-wing portions 124, 126 receive a coupler 190, for example a rubber band, that extends between the superior and inferior tie-wing portions 124, 126 and across the slot 174 to secure the orthodontic arch wire 192 in the slot 174. The coupler 190 is secured on the flanges 144 of the superior and inferior tie-wing portions 124, 126.

The orthodontic arch wire 192 fits in a rectangular slot 174, which is horizontal across the bracket member 102. This slot 174 is often approximately 0.018 inches vertically and approximately 0.025 inches depth. Often, the orthodontic arch wire 192 is an approximately 0.017×0.0022 inch arch wire. This leaves only one thousandth of an inch "play" for the orthodontic arch wire 192 to fit in the slot 174. Normally, initially placed orthodontic arch wires 192 are thinner and more flexible. This allows teeth to progressively align as newly placed orthodontic arch wires 192 become thicker and less flexible. Even so part of the difficulty in placing the orthodontic arch wire 192 is that the slot opening is typically rectangular with a 90-degree corner. The bracket member 102 eliminates the "corners" in the above mentioned dimensions that at times can make it difficult for an orthodontic bracket to engage the orthodontic arch wire 192 completely. These corners are replaced with the rounded mesial end 180 and rounded distal end 182. Again, if the fit is not good this presents a problem getting the arch wire to fully engage in the slot 174 thereby affecting the desired movement on the tooth. The bracket member 102 has a parabolic opening to the bracket slot 174. The bracket member 102 is deeper in this dimension and the opening of the bracket slot 174 is approximately twice the 0.018 fully engaged slot 174. That is, a distance 200 between the superior apex 160 and the inferior apex 162 is approximately twice a distance 202 between the planar side walls 140. Also, the rounded mesial end 180 and rounded distal end 182 allow the bracket member 102 to more easily engage the orthodontic arch wire 192 in mesial-distal dimension.

The orthodontic bracket 100 is in effect the handle by which the orthodontic arch wire 192 can exert three-dimensional force on the tooth thereby causing the tooth to move in the desired direction. Force can be exerted as a moment, rotation, bodily tooth movement, or tipping of the roots mesially or distally. For these movements of the teeth to occur precisely the orthodontic arch wire 192 must be seated in the rectangular or planar walls 140 of the bracket member 102. The orthodontic arch wires 192 used for these precise movements are rectangular in cross section and of different dimensions thereby allowing the planar walls 140 to fit tightly or sometimes less tightly. The bracket member 102 has a typically shaped and dimensioned planar walls 140 for a single tie wing bracket. However, the opening in mesial-distal dimension and buccal-lingual dimension is curved or generally parabolic in shape to allow the orthodontic arch wire 192 to more easily seat itself inside the planar section of the bracket member 102.

Figure 5:
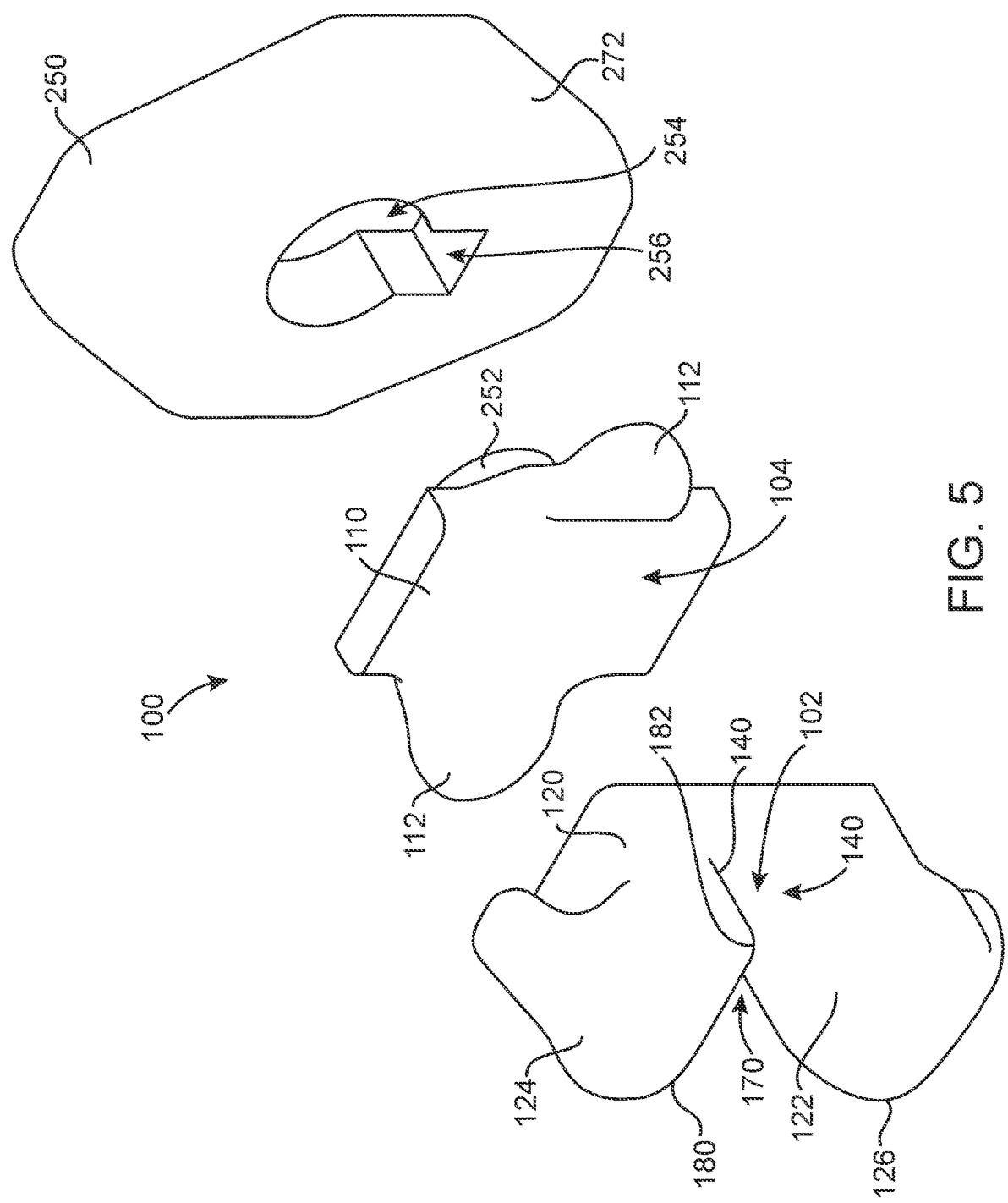
FIG. 5 is an exploded view of the bracket assembly of FIG. 1.

Referring to FIG. 5, in one embodiment, the support member 104 is integrally formed with a mounting plate 250, however, as shown in FIG. 5, the support member 104 may be removably coupled to the mounting plate 250. The mounting plate 250 may be comprised of a metallic material, such as nickel titanium or titanium molybdenum, although additional embodiments of mounting plate 250 may be comprised of polymeric and/or ceramic materials instead of or in addition to a metallic material. In one embodiment, the mounting plate 250 may be configured in an octagonal shape, however, the mounting plate 250 may be formed in any shape necessary for attaching to the tooth and/or the application of orthodontic treatment. As shown best in FIG. 5, if the support member 104 is configured to be removably coupled to the mounting plate 250, the support member 104 includes a protrusion 252 extending lingually therefrom. The protrusion 252 is configured to be received within an opening 254 of the mounting plate 250. When the support member 104 is coupled to the mounting plate 250, additional coupling members (e.g., mechanical fasteners, adhesive, welds, bonds, or any other type of coupling mechanism) may be used to secure the support member 104 to the mounting plate 250. In one embodiment, the protrusion 252 and the opening 254 may be configured with a locking feature, such as a key or other projection on the protrusion 252 configured to be received within a slotted portion 256 of the opening 254. Rotational movement or other techniques may be used to then secure the support member 104 to the mounting plate 250 through the key on the protrusion 252 and the opening 254.

Figure 2:
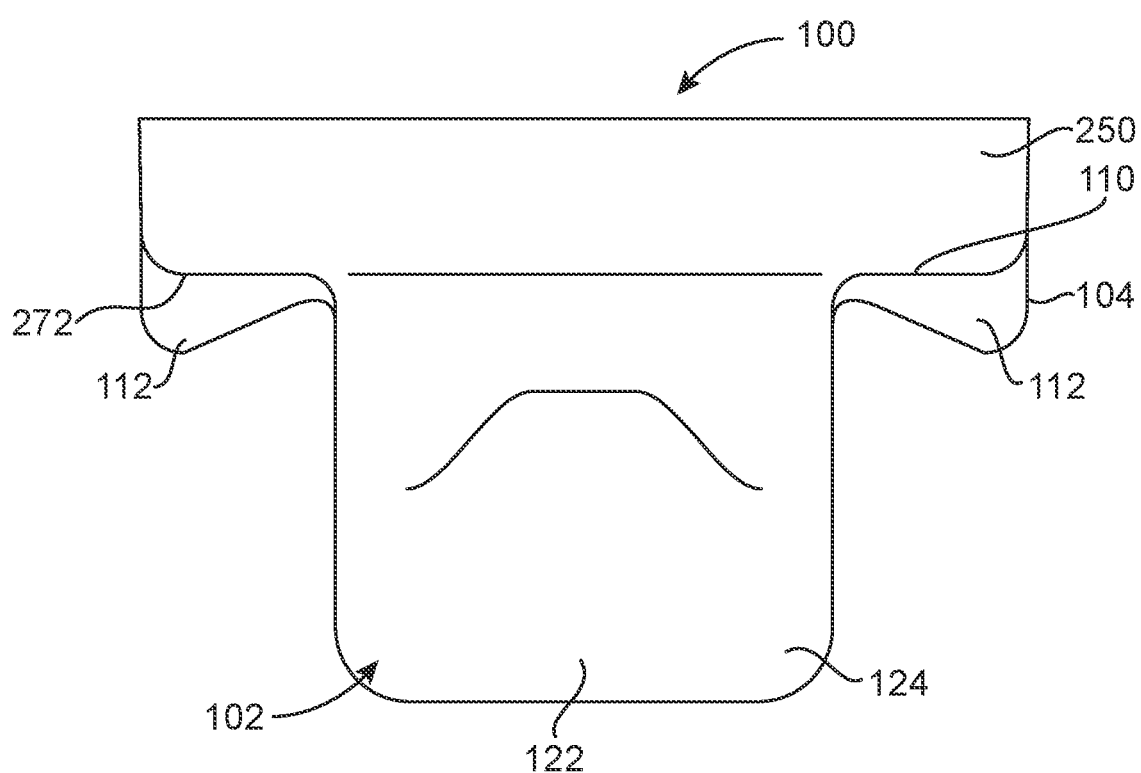
FIG. 2 is a top view of the bracket assembly of FIG. 1, where a bottom view of the bracket assembly of FIG. 1 is identical.
Figure 3:
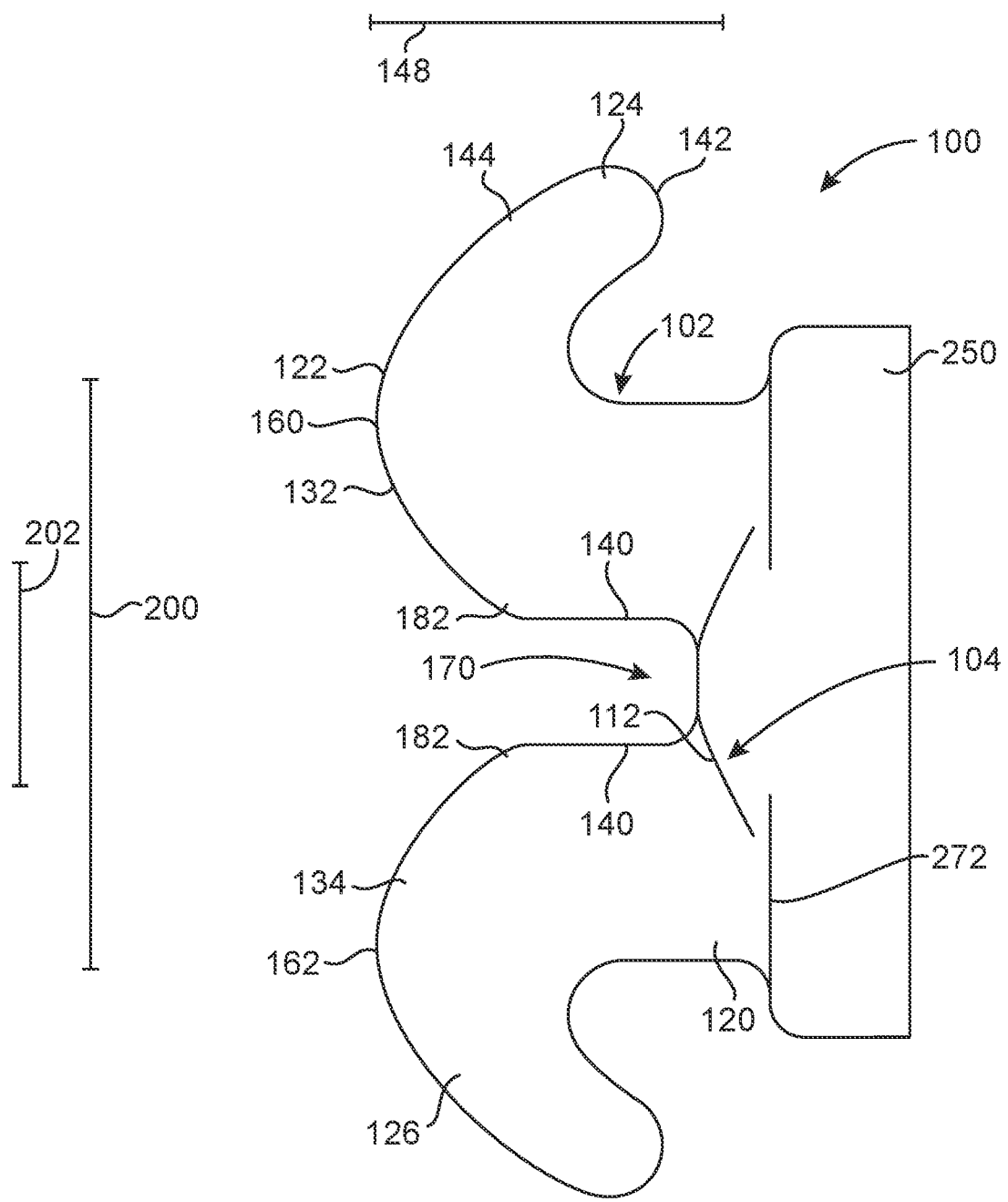
FIG. 3 is a side view of the bracket assembly of FIG. 1, where the opposing side view of the bracket assembly of FIG. 1 is identical.
Figure 4:
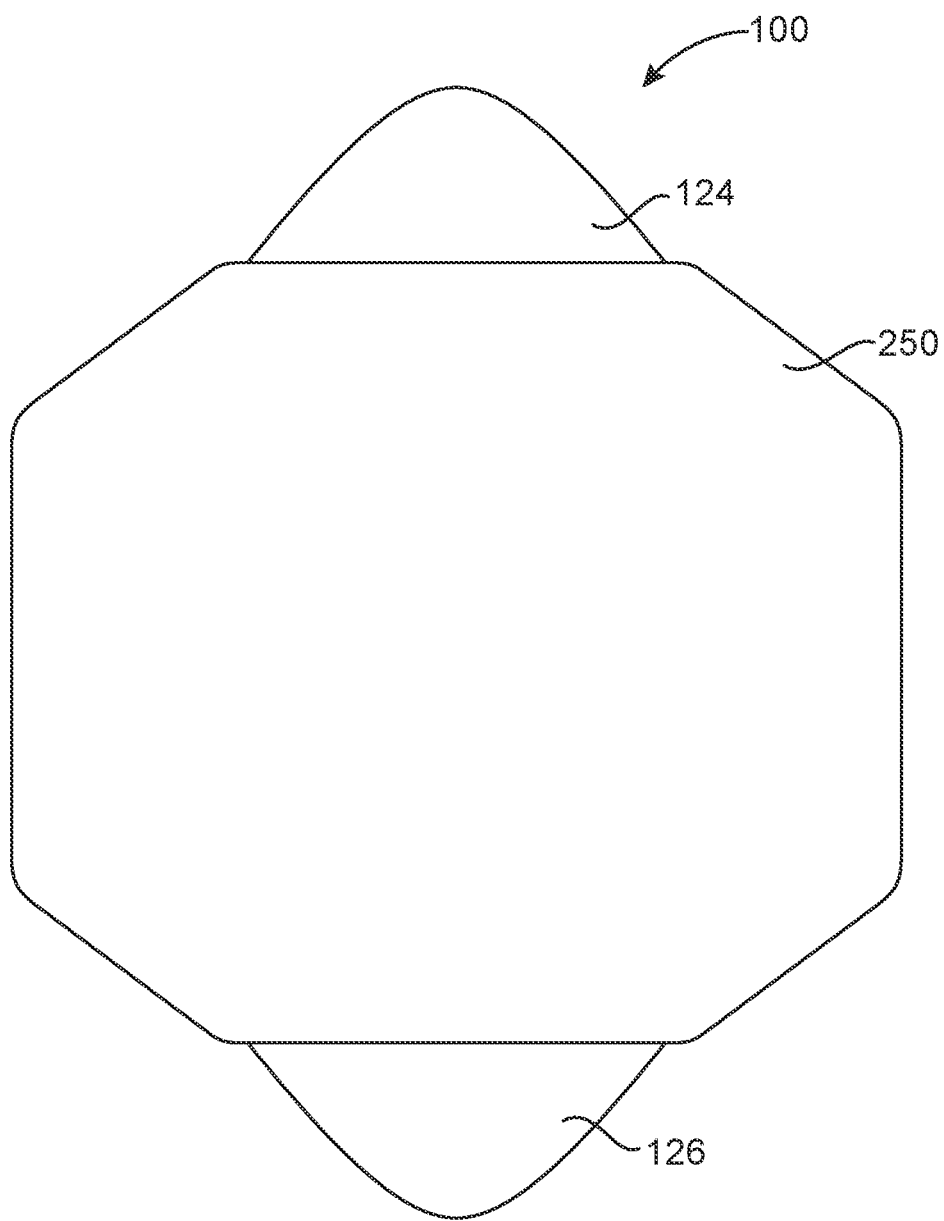
FIG. 4 is a rear view of the bracket assembly of FIG. 1.

The support member 104 may be configured with the generally square base member 110 and the tabs 112 extending buccally outward therefrom. In this way, the tabs 112 are angled forwardly and outwardly relative to the base member 110. In one embodiment, the base member 110 and the tabs 112 may be integrally formed together, however, in alternative embodiments, the base member 110 and the tabs 112 may be separable from each other and removably coupled to each other during use of bracket assembly 100. Illustratively, and as shown in FIGS. 2 and 3, a rearward surface 270 of the tabs 112 may be flush against a forward surface 272 of the mounting plate 250 such that there is no space defined therebetween or separation between the rearward surface 270 of the tabs 112 and the forward surface 272 of the mounting plate 250. The base member 110 and the tabs 112 may be configured with any shape applicable to bracket assembly 100.

The mounting plate 250 and the support member 104 may be comprised of a ceramic material, although additional embodiments of the support member 104 may be comprised of polymeric and/or metallic materials instead of or in addition to a ceramic material. For example, at least the illustrative tabs 112 may be comprised of a material configured to bend or flex in response to a pressure applied thereto. More particularly, as orthodontic treatment progresses, wires of increased stiffness are used and, if the interface of the stiff orthodontic arch wire 192 and the tabs 112 is stiff and unbending, it may be difficult to seat the orthodontic arch wire 192 in slot 30. However, in one embodiment, the tabs 112 are comprised of a material configured to flex or bend, such as a flexible metal. In this way, the tabs 112 may flex when in contact with the stiff wire, thereby providing a force that is felt by the attached tooth. Thus, if using a conventional orthodontic bracket, only the orthodontic arch wire 192 has the ability to flex, however, the bracket assembly 100 of the present disclosure presents a combination of flexing or bending which is capable by both the orthodontic arch wire 192 and the tabs 112 for increasing the force applied to the attached tooth.

Additionally, the ability for the tabs 112 to flex allows for ease of seating the wire within the slot 174.

Referring now to FIGS. 6-10, an orthodontic bracket assembly 300 is shown which has generally the same components and features as the bracket assembly 100 of FIGS. 1-5. The bracket assembly 300 includes a mounting base or plate 302, a support member 304, and a bracket member 306. The mounting plate 302 is configured to be attached a tooth using convention adhesive or bonding materials and processes. In this way, the mounting plate 302 remains in a fixed position on the tooth unless removed therefrom and reattached. The mounting plate 302 may be comprised of a metallic material, such as nickel titanium or titanium molybdenum, although additional embodiments of mounting plate 302 may be comprised of polymeric and/or ceramic materials instead of or in addition to a metallic material. In one embodiment, the mounting plate 302 may be configured in an octagonal shape, however, the mounting plate 302 may be formed in any shape necessary for attaching to the tooth and/or the application of orthodontic treatment. The illustrative mounting plate 302 also includes rounded or curved edges along a perimeter thereof, which may define a reduction in the amount of mounting plate 302, which is visible, thereby improving the aesthetics of bracket assembly 300 on a patient's tooth.

Figure 10:
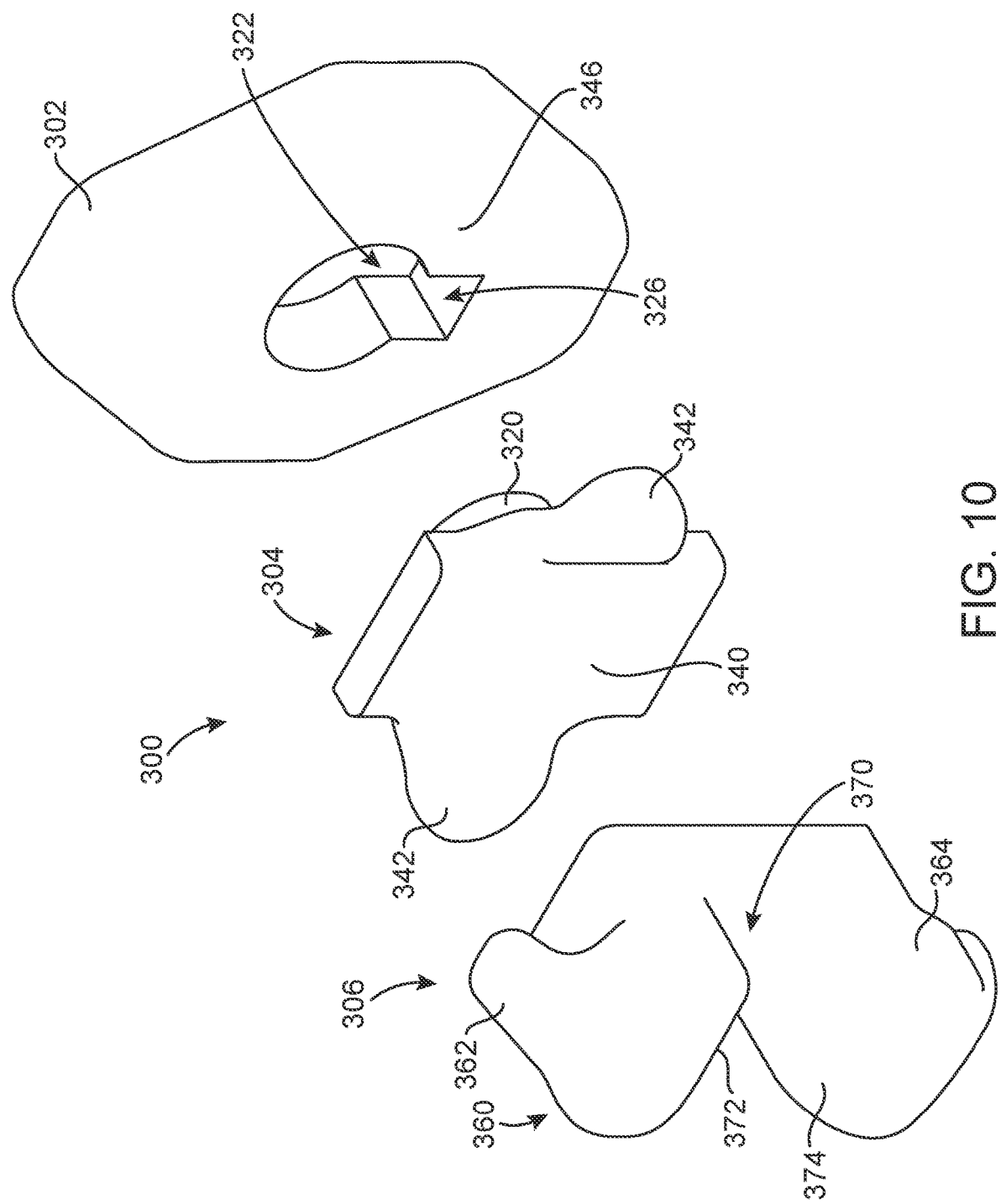
FIG. 10 is an exploded view of the bracket assembly of FIG. 6.

Referring still to FIGS. 6-10, in one embodiment, the support member 304 is integrally formed with the mounting plate 302, however, as shown in FIG. 10, the support member 304 may be removably coupled to the mounting plate 302. As shown best in FIG. 10, if the support member 304 is configured to be removably coupled to the mounting plate 302, the support member 304 includes a protrusion 320 extending lingually therefrom. Protrusion 320 is configured to be received within an opening 322 of the mounting plate 302. When the support member 304 is coupled to the mounting plate 302, additional coupling members (e.g., mechanical fasteners, adhesive, welds, bonds, or any other type of coupling mechanism) may be used to secure the support member 304 to the mounting plate 302. Alternatively, the protrusion 320 and the opening 322 may be configured with a locking feature, such as a key or other projection 324 on protrusion 320 (FIG. 9) configured to be received within a slotted portion 326 of the opening 322. Rotational movement or other techniques may be used to then secure the support member 304 to the mounting plate 302 through key 324 (FIG. 9) on the protrusion 320 and the opening 322.

Figure 7:
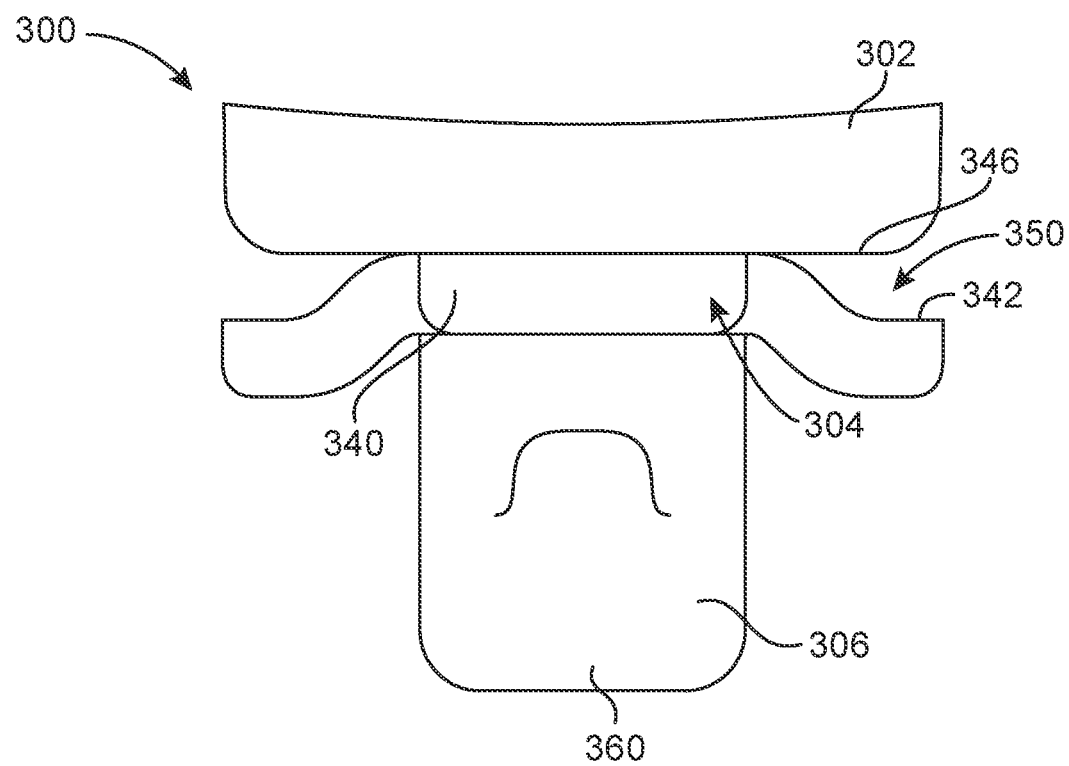
FIG. 7 is a top view of the bracket assembly of FIG. 6, where a bottom view of the bracket assembly of FIG. 6 is identical.
Figure 8:
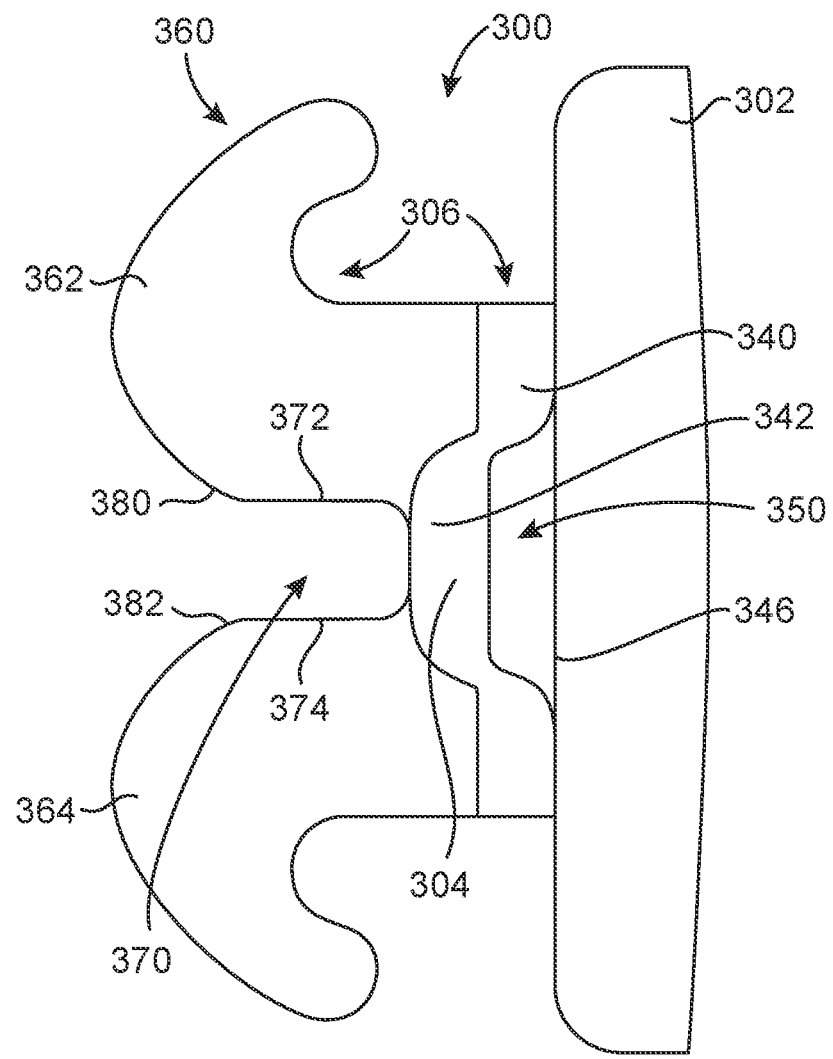
FIG. 8 is a side view of the bracket assembly of FIG. 6, where the opposing side view of the bracket assembly of FIG. 6 is identical.
Figure 9:
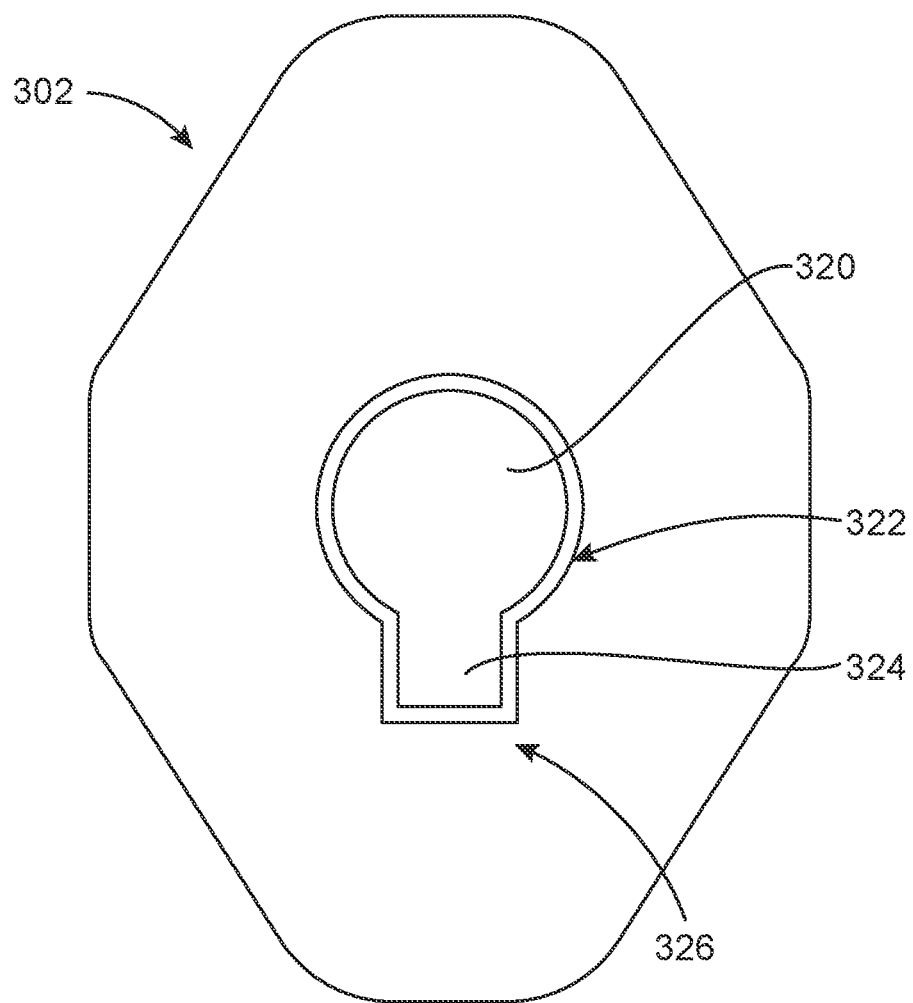
FIG. 9 is a rear view of the bracket assembly of FIG. 6.

The support member 304 may be configured with a generally square body portion 340 coupled with a plurality of tabs 342 extending bucally outward therefrom. In this way, the tabs 342 are angled forwardly and outwardly relative to body portion 340. In one embodiment, the body portion 340 and the tabs 342 may be integrally formed together, however, in alternative embodiments, the body portion 340 and the tabs 342 may be separable from each other and removably coupled to each other during use of the bracket assembly 300. Illustratively, and as shown in FIGS. 7 and 8, a rearward surface 344 of the tabs 342 may be spaced apart from a forward surface 146 of the mounting plate 302 such that a space or gap 350 may be defined therebetween. The gap 350 may allow for increased flexing or bending of the tabs 342 when the orthodontic arch wire 192 (FIG. 1) is applied thereto, as disclosed herein. However, as shown in FIG. 8, while the tabs 342 may be spaced apart from the forward surface 146 of the mounting plate 302, the body portion 340 at least partially contacts the forward surface 146 of the mounting plate 302. The body portion 340 and the tabs 342 may be configured with any shape applicable to the bracket assembly 300.

As with the mounting plate 302, the support member 304 may be comprised of a metallic material, although additional embodiments of the support member 304 may be comprised of polymeric and/or ceramic materials instead of or in addition to a metallic material. For example, at least illustrative the tabs 342 may be comprised of a material configured to bend or flex in response to a pressure applied thereto. More particularly, as orthodontic treatment progresses, wires, such as the orthodontic arch wire 192 (FIG. 1), of increased stiffness are used and, if the interface of the stiff orthodontic arch wire 192 and the tabs 342 is stiff and unbending, it may be difficult to seat the orthodontic arch wire 192 in slot 174. However, in one embodiment, the tabs 342 are comprised of a material configured to flex or bend, such as a flexible metal. In one embodiment, metallic materials, such as nickel titanium or titanium molybdenum, may have a sufficient modulus of elasticity to allow for such flexibility of the tabs 342. In this way, the tabs 342 may flex when in contact with the stiff wire, thereby providing a force that is felt by the attached tooth. Thus, while with a conventional orthodontic bracket, only the wire has the ability to flex, the bracket assembly 300 of the present disclosure presents a combination of flexing or bending which is capable by both the orthodontic arch wire 192 and the tabs 342. Additionally, the ability for the tabs 342 to flex allows for ease of seating orthodontic arch wire 192 within the slot 174.

Referring again to FIGS. 6-10, the bracket member 306 may be supported on the mounting plate 302 through the support member 304. For example, the bracket member 306 may be removably or fixedly coupled to the support member 304 with conventional couplers, such as mechanical fasteners, adhesives, welds, rivets, or any other type of coupling mechanism. In this way, the position of the bracket member 306 may be adjusted relative to the support member 304 and the mounting plate 302 before the bracket member 306 is coupled to the support member 304. However, once the bracket member 306 is coupled to the support member 304, the position of the bracket member 306 may remain fixed throughout the orthodontic treatment unless the bracket assembly 300 is entirely replaced on the tooth. As with the mounting plate 302 and the support member 304, the bracket member 306 may be comprised of a metallic material, although additional embodiments of the bracket member 306 may be comprised of polymeric and/or ceramic materials instead of or in addition to a metallic material.

The bracket member 306 includes a tie-wing 360 having a superior portion 362 and an inferior portion 364. As such, illustrative the bracket member 306 defines a single-tie wing configuration. Illustratively, superior portion 362 defines an upper portion of the tie-wing 360 and the inferior portion 364 defines a lower portion of tie-wing 28. The superior portion 362 and inferior portion 364 are configured to project bucally and angle, curve, or bend superiorly or inferiorly, respectively. In this way, the superior portion 362 and inferior portion 364 define hook-type portions of tie-wing 360, which may be configured to receive coupler 190, or the like (FIG. 1), as disclosed further herein. In one embodiment, the superior portion 362 and inferior portion 364 may be comprised of a material configured to flex or bend when a pressure is applied, thereby facilitating assembly of coupler 190 thereon. However, if the superior portion 362 and inferior portion 364 are comprised of a material configured to flex or bend, the material may be biased toward the position shown in FIGS. 6-10, such that after the coupler 190 is applied, the superior portion 362 and inferior portion 364 return to their respective superior or inferior positions to maintain tension on the coupler 190.

The tie-wing 360 of the bracket member 306 also defines the slot 370 positioned intermediate the superior portion 362 and inferior portion 364. More particularly, the slot 370 is positioned vertically intermediate the superior portion 362 and inferior portion 364. The slot 370 is defined by parallel surfaces 372, 374 of the superior portion 362 and the inferior portion 364, respectively, of the bracket member 306. The slot 370 is configured to receive the orthodontic arch wire 192 (FIG. 1) or the like which extends around a portion of the teeth needing adjustment and is positioned within adjacent slots on adjacently-positioned bracket assemblies 300. The slot 370 generally defines a rectangular cross-sectional profile due to parallel surfaces 372, 374, as shown best in FIGS. 6 and 8, which allows any orthodontic arch wire 192 inserted therein to be adjusted in any dimension to apply a force or torque against the bracket assembly 300 and the tooth in any number of ways necessary to move the tooth to a desired position.

Figure 6:
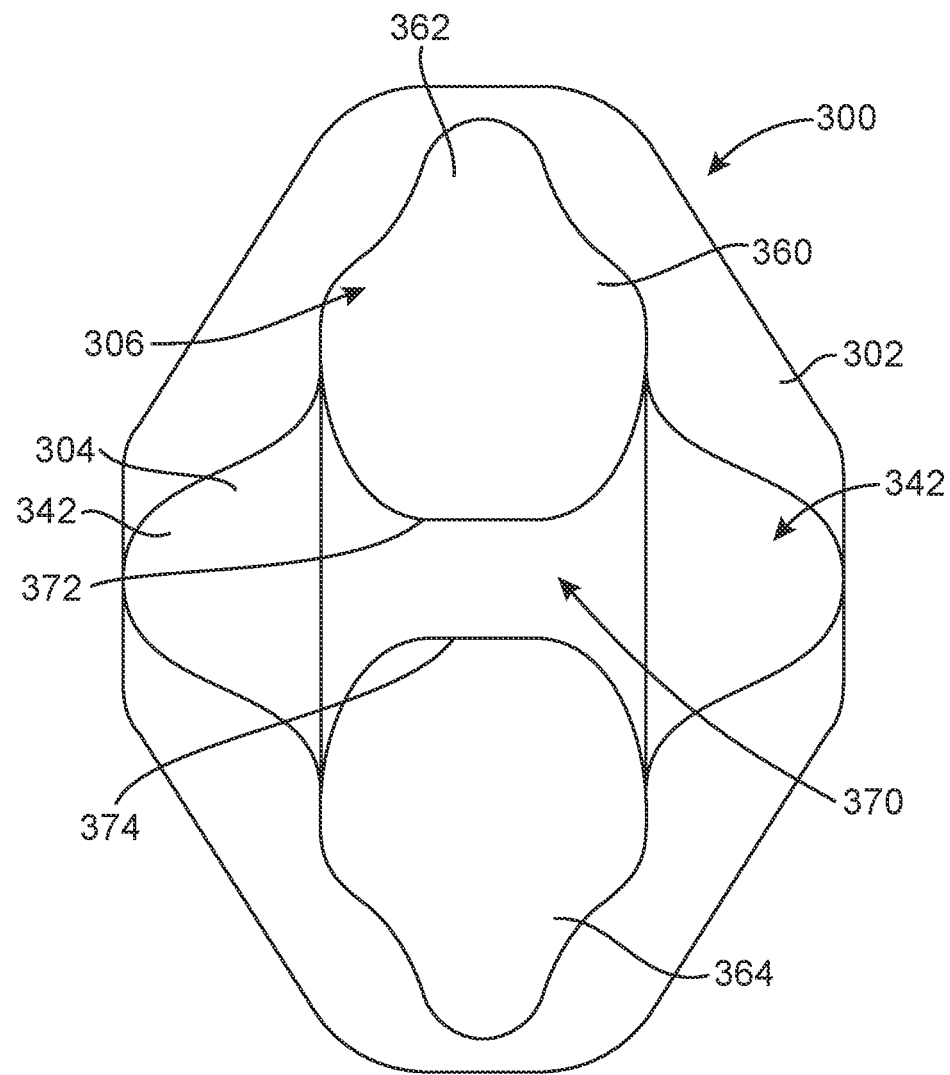
FIG. 6 is a front view of an illustrative orthodontic bracket assembly of the present disclosure, where the bracket assembly is at least partially comprised of a metallic material.

However, as shown best in FIGS. 6 and 8, the slot 370 is configured with a parabolic entrance. More particularly, the entrance of slot 370 is generally curved, rounded, arcuate, or parabolic and defines a "U" shape due to curved surfaces 380, 382 of the superior portion 362 and inferior portion 364 of tie-wing 360, respectively. The curved or parabolic entrance of the slot 370 is defined as the radius bending or curvature connecting the horizontal portion of the superior portion 362 and inferior portion 364 defined by the surfaces 372, 374 and the vertical portion of the superior portion 362 and inferior portion 364. In this way, the curved surfaces 380, 382 define the outermost extent of the parallel surface 372, 374, respectively, and further define the parabolic entrance of the slot 370 which allows orthodontic arch wire 192 (FIG. 1) or the like to be guided towards and seated within the slot 370 during assembly of the orthodontic arch wire 192 with the bracket assembly 300. For example, as the orthodontic arch wire 192 is being inserted into the slot 370, the orthodontic arch wire 192 may initially contact a portion of the tie-wing 360, rather than directly moving into the slot 370; however, the parabolic entrance of the slot 370 guides the orthodontic arch wire 192 into the slot 370. Once in the slot 370, the depth thereof retains the orthodontic arch wire 192 therein. Additionally, the coupler 190 (FIG. 1) or the like may be looped or hooked around the superior portion 362 and inferior portion 364 of tie-wing 360 to extend in a vertical direction to further retain the orthodontic arch wire 192 in the slot 130.

In this way, the embodiment of FIGS. 6-10 discloses that the orthodontic bracket assembly 300 may be comprised of a metallic material and allows for easier insertion of the orthodontic arch wire 192 (FIG. 1) into the slot 370 of the bracket member 306 when applying the bracket assembly 300 to a patient's tooth. More particularly, the parabolic entrance of the slot 370 facilitates insertion of the orthodontic arch wire 192 into the slot 370 by allowing for the orthodontic arch wire 192 glide over the curved surfaces 380, 382 as the orthodontic arch wire 192 is moved toward the slot 370. The curvature or parabolic configuration of the curved surfaces 380, 382 guides and directs the orthodontic arch wire 192 into the slot 370 rather than inhibiting direct insertion of the orthodontic arch wire 192 therein.

Referring now to FIGS. 11-15, an orthodontic bracket assembly 400 is shown and may have some of the same components and features as bracket assembly 100 of FIGS. 1-5 and bracket assembly 300 of FIGS. 6-10. The bracket assembly 400 includes a mounting base or plate 402, a support member 404, and a bracket member 406. The mounting plate 402 is configured to be attached a tooth using convention adhesive or bonding materials and processes. In this way, the mounting plate 402 remains in a fixed position on the tooth unless removed therefrom and reattached. In one embodiment, the mounting plate 402 may be configured in a rectangular shape, however, the mounting plate 402 may be formed in any shape necessary for attaching to the tooth and/or to comply with the application of the orthodontic treatment. The illustrative mounting plate 402 also includes rounded or curved edges along a perimeter thereof, which may define a reduction in the amount of the mounting plate 402 which is visible, thereby improving the aesthetics of the bracket assembly 400 on a patient's tooth.

The mounting plate 402 also includes a plurality of detents or projections 410 extending buccally from a forward surface 412 thereof. Illustratively, the detents 410 define raised portions of the mounting plate 402 and may be arranged in a generally rounded or curved pattern about each of the mesial and distal side of the mounting plate 402. A plurality of grooves 414 may be defined between adjacent detents 410 such that a component of the bracket assembly 400 may be positioned within one of the grooves 414 and is supported and/or maintained within the groove 414 by the adjacent detents 410 defining the groove 414, as disclosed further herein. The detents 410 may be equally spaced apart from adjacent detents 410, thereby defining a plurality of equally-sized grooves 414. In one embodiment, the grooves 414 are sized to receive a portion of the support member 404, as disclosed herein.

Referring still to FIGS. 11-15, the support member 404 is configured to be removably coupled to the mounting plate 402. The support member 404 includes an opening 420 configured to align with an opening 422 of the mounting plate 402. The opening 420 is positioned on a body portion 430 of the support member 404. Both the openings 420 and 422 of the support member 404 and the mounting plate 402, respectively, are configured to receive a protrusion 432 (FIG. 14) of the bracket member 406, as disclosed further herein. As such, the protrusion 432 of the bracket member 406 is configured to retain the support member 404 on the mounting plate 402, however, additional couplers, such as removable mechanical fasteners, may be used to further couple the support member 404 with the mounting plate 402.

Figure 12:
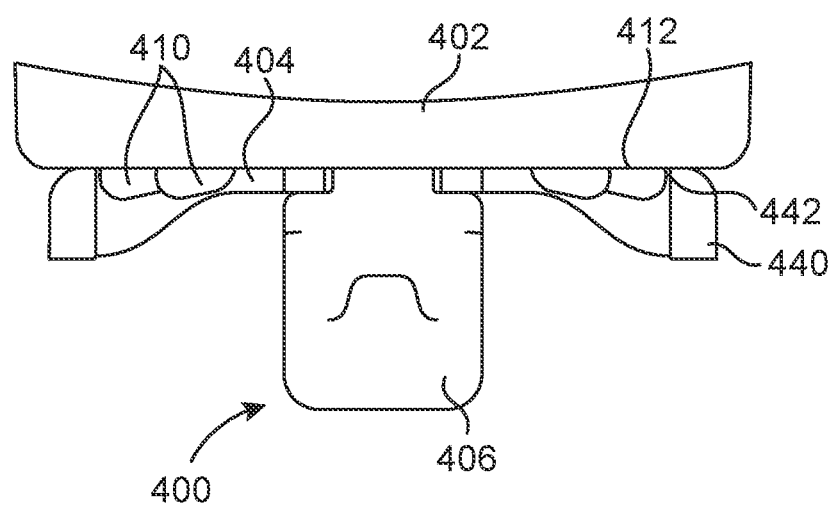
FIG. 12 is a top view of the bracket assembly of FIG. 11, where a bottom view of the bracket assembly of FIG. 11 is identical.
Figure 13:
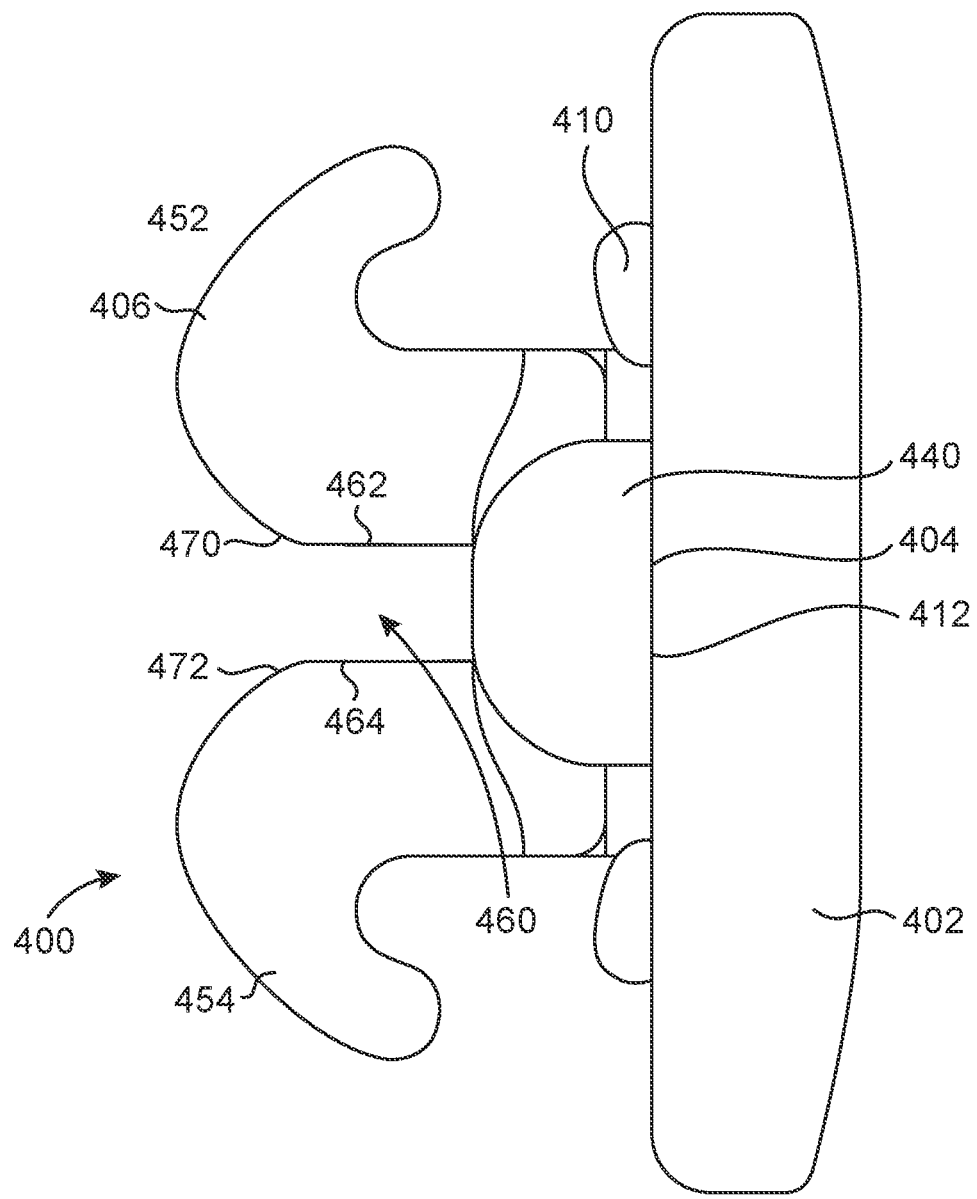
FIG. 13 is a side view of the bracket assembly of FIG. 11, where the opposing side view of the bracket assembly of FIG. 11 is identical.
Figure 14:
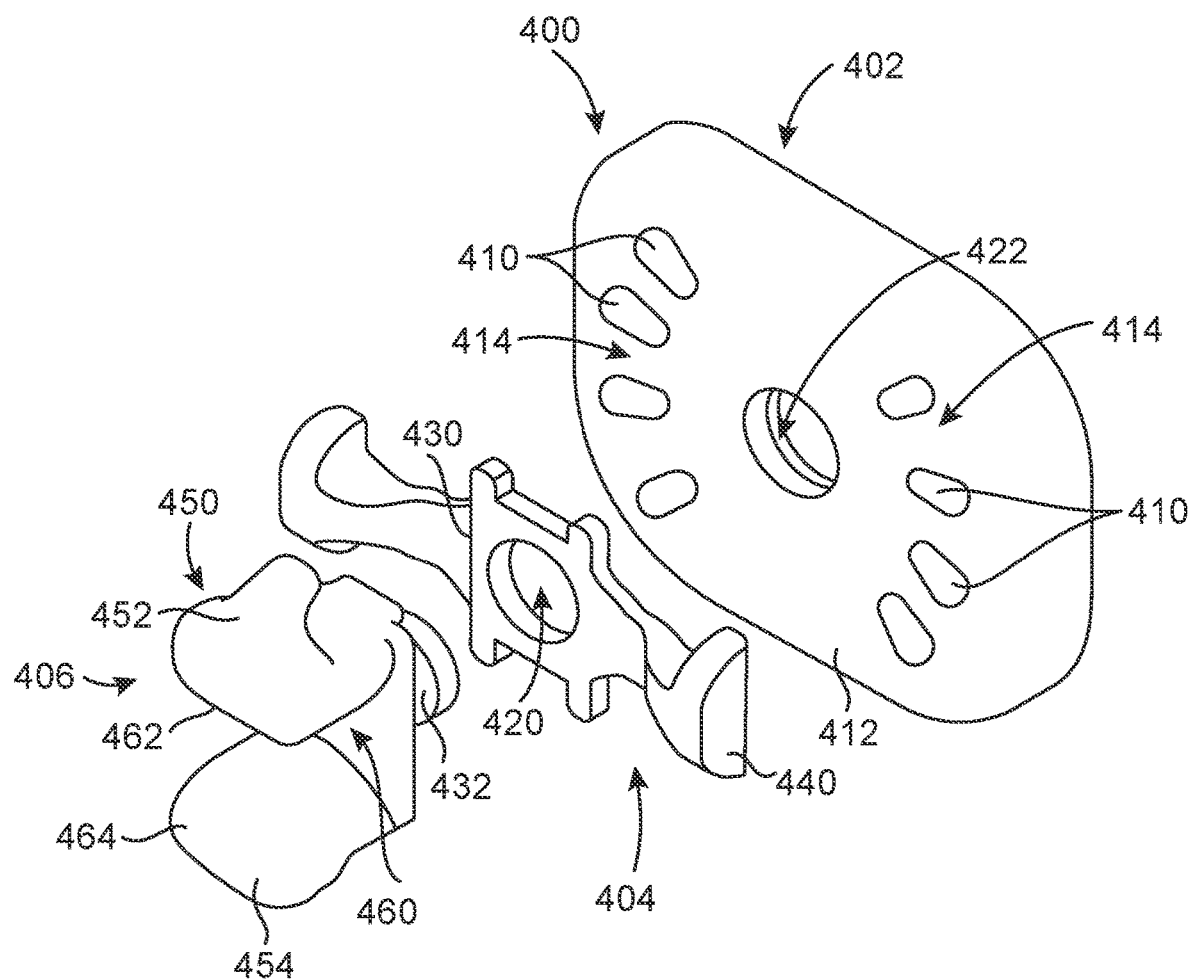
FIG. 14 is an exploded view of the bracket assembly of FIG. 11.
Figure 15:
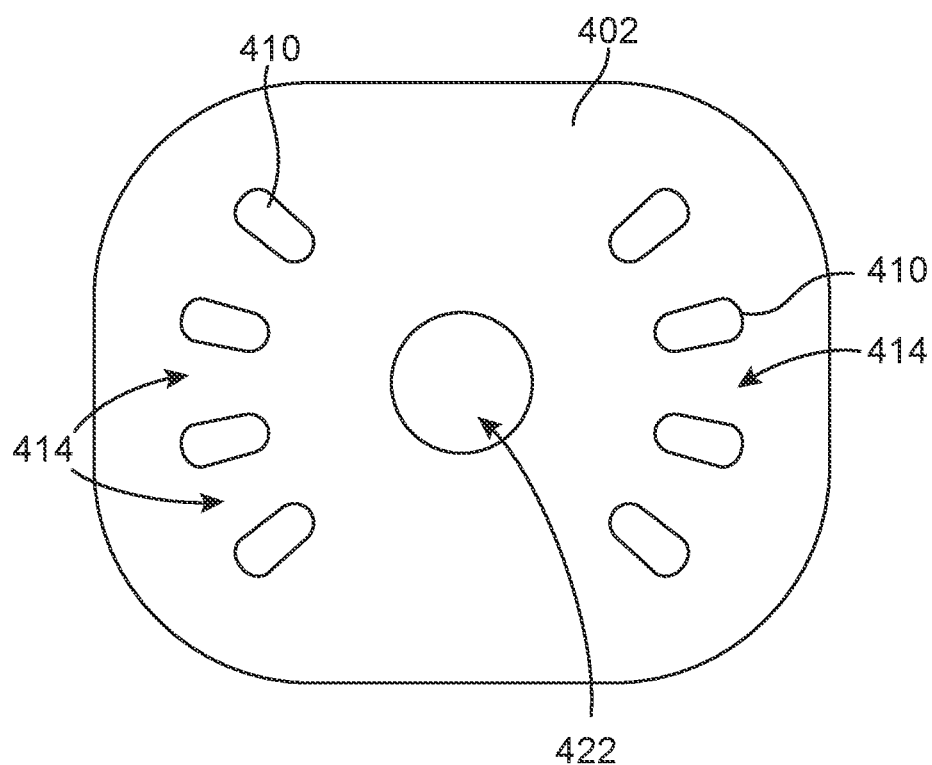
FIG. 15 is a front view of a mounting plate of the bracket assembly of FIG. 11.

The support member 404 may be configured with a generally square body portion 430 coupled with a plurality of tabs 440 extending buccally outward therefrom. In this way, the tabs 440 are angled forwardly and outwardly relative to the body portion 430. In one embodiment, the body portion 430 and the tabs 440 may be integrally formed together, however, in alternative embodiments, the body portion 430 and the tabs 440 may be separable from each other and removably coupled to each other during use of the bracket assembly 400. Illustratively, and as shown in FIGS. 12 and 13, a rearward surface 442 of tabs 440 may be flush against the forward surface 412 of the mounting plate 402 such that there is no space defined therebetween or separation between the rearward surface 442 of the tabs 440 and the forward surface 412 of the mounting plate 402. The body portion 430 and the tabs 440 may be configured with any shape applicable to the bracket assembly 400.

Illustratively, the tabs 440 are configured to be received within one of the grooves 414 of the mounting plate 402. The tabs 440 are retained within the groove 414 with adjacent detents 410. Because the support member 404 is configured to be removably coupled with the mounting plate 402, the position of the tabs 440 within any of the grooves 414 allows for rotational movement or re-positioning of the support member 404 relative to the mounting plate 402. Additionally, because the bracket member 406 is coupled to the support member 404 through the protrusion 432 (FIG. 14), rotational movement or re-positioning of the support member 404 on the mounting plate 402 also causes rotational movement or re-positioning of the bracket member 406 relative to the mounting plate 402. As such, while the bracket assembly 100 of FIGS. 1-5 and the bracket assembly 300 of FIGS. 6-10 may allow for the position of the bracket member 102, 306 to be adjusted before the bracket member 102, 306 and support member 104, 304 are coupled to the mounting plate 250, 302, bracket assembly 400 of FIGS. 11-15 allows for continuous adjustment and re-positioning of the support member 404 and the bracket member 406 relative to the mounting plate 402 throughout an orthodontic treatment.

Referring again to FIGS. 11-15, the bracket member 406 is configured to couple with the support member 404 and the mounting plate 402 through the protrusion 432 (FIG. 14). The protrusion 432 extends lingually from the bracket member 406 and is configured to be received within the openings 420 and 422 of the mounting plate 402 and the support member 404, respectively.

The bracket member 406 also includes a tie-wing 450 having a superior portion 452 and an inferior portion 454, thereby defining a single tie-wing configuration. Illustratively, the superior portion 452 defines an upper portion of tie-wing 450 and the inferior portion 454 defines a lower portion of tie-wing 450. The superior portion 452 and inferior portion 454 are configured to project in a buccal direction and angle, curve, or bend superiorly or inferiorly, respectively. In this way, the superior portion 452 and inferior portion 454 define hook-type portions of the tie-wing 450 which may be configured to receive coupler 190 (FIG. 1) or the like, as disclosed further herein. In one embodiment, the superior portion 452 and inferior portion 454 may be comprised of a material configured to flex or bend when a pressure is applied, thereby facilitating assembly of coupler 190 thereon. However, if the superior portion 452 and inferior portion 454 are comprised of a material configured to flex or bend, the material may be biased toward the position shown in FIGS. 11-15, such that after coupler 190 is applied, the superior portion 452 and inferior portion 454 return to their respective superior and inferior positions to maintain tension on coupler 190.

The tie-wing 450 of the bracket member 306 also defines a slot 460 positioned intermediate the superior portion 452 and inferior portion 454. More particularly, the slot 460 is positioned vertically intermediate the superior portion 452 and inferior portion 454. The slot 460 is defined by parallel surfaces 462, 464 of the superior portion 452 and inferior portion 454, respectively. The slot 460 is configured to receive the orthodontic arch wire 192 (FIG. 40) or the like which extends around a portion of the teeth needing adjustment and is positioned within adjacent slots on adjacently-positioned bracket assemblies 400. The slot 460 generally defines a rectangular cross-sectional profile due to parallel surfaces 462, 464, as shown best in FIGS. 11 and 13, which allows any orthodontic arch wire 192 inserted therein to be adjusted in any dimension to apply a force or torque against the bracket assembly 400 and the tooth in any number of ways necessary to move the tooth to a desired position.

Figure 11:
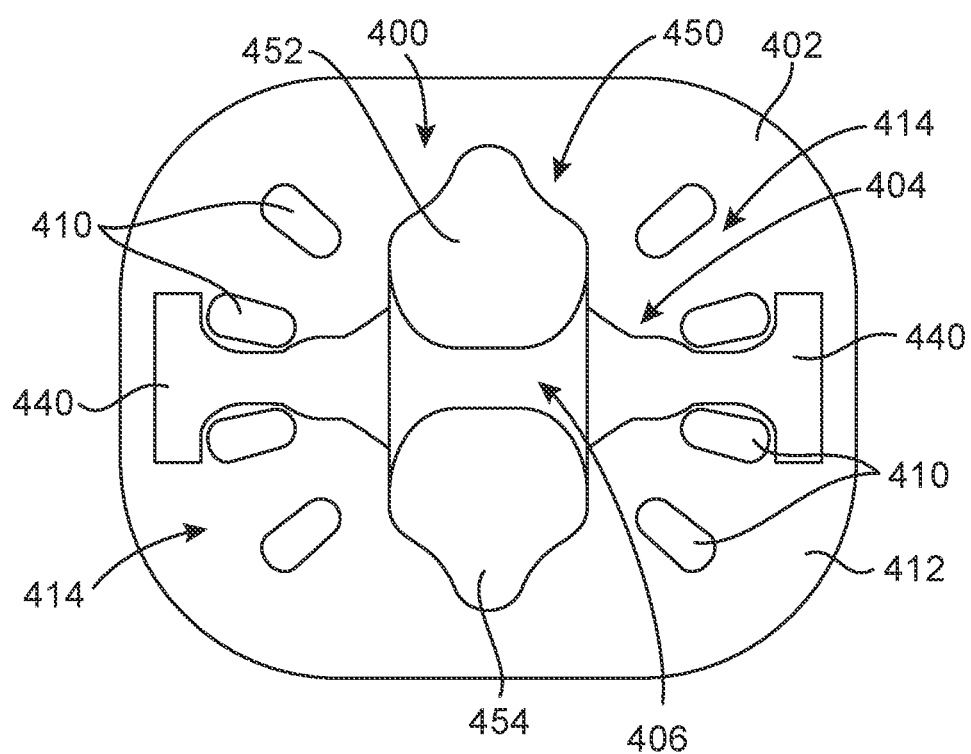
FIG. 11 is a front view of an illustrative orthodontic bracket assembly of the present disclosure, where the bracket assembly is at least partially rotatable.

However, as shown best in FIGS. 11 and 13, the slot 460 is configured with a parabolic entrance. More particularly, the entrance of the slot 460 is defined by the mesial and distal ends of surfaces 462, 464 and is generally curved, rounded, arcuate, or parabolic. More particularly, the entrance of the slot 460 defines a "U" shape due to curved surfaces 470, 472 of the superior portion 452 and inferior portion 454 of the tie-wing 450, respectively. In this way, curved surfaces 470, 472 define the parabolic entrance of the slot 460 which allows the orthodontic arch wire 192 (FIG. 1) or the like to be guided towards and seated within the slot 460 during assembly of the orthodontic arch wire 192 with the bracket assembly 400. For example, a orthodontic arch wire 192 is being inserted into the slot 460, the orthodontic arch wire 192 may initially contact a portion of the tie-wing 450, rather than directly moving into the slot 460; however, the parabolic entrance of the slot 460 guides the orthodontic arch wire 192 into the slot 460. Once in the slot 460, the depth thereof retains the orthodontic arch wire 192 therein. Additionally, the coupler 190 (FIG. 1) or the like may be looped or hooked around the superior portion 452 and inferior portion 454 of the tie-wing 450 to extend in a vertical direction to further retain the orthodontic arch wire 192 in the slot 460.

When the bracket assembly 400 is used for on a patient's tooth, the mounting plate 402 is adhered or otherwise secured to the tooth. The support member 404 is then joined with the mounting plate 402 by positioning the tabs 440 of the support member 404 within the appropriate grooves 414 on the mounting plate 402 to ensure appropriate correction of the patient's tooth. The bracket member 406 then couples with the support member 404 and the mounting plate 402 by inserting the protrusion 432 within the openings 420, 422, respectively. The bracket member 406 also may be secured to the support member 404 and/or the mounting plate 402 with additional removable couplers (not shown). Once the support member 404 and the bracket member 406 are located in the desired orientation relative to the mounting plate 402, it may be appreciated that the slot 460 also is at such an orientation. In this way, the rotational movement or re-positioning of the support member 404 on the mounting plate 402, through the use of the detents 410 and the grooves 414, allows for rotational movement or re-positioning of the slot 460 of the bracket member 406 during the orthodontic process. The orthodontic arch wire 192 (FIG. 1) may be inserted into the slot 460 when the slot 460 is in the desired location and the coupler 190 (FIG. 1) or the like may be positioned outwardly from the orthodontic arch wire 192 by coupling with the superior portion 452 and inferior portion 454 of bracket member 406.

In one embodiment, if, during the course of an orthodontic treatment, it is desirable to adjust the location or orientation of the slot 460, the orthodontic arch wire 192 may be removed therefrom and the tabs 440 of the support member 404 may be flexed or bent outwardly buccally to allow the support member 404 and the bracket member 406 to rotate within the opening 422 of the mounting plate 402 before allowing the tabs 440 to bias to their unflexed or unbent position to be placed in a different groove 414. As such, it may not be necessary to remove the support member 404 or the bracket member 406 from the mounting plate 402 when adjusting the position or orientation of the slot 460.

In this way, the bracket assembly 400 is configured to allow the slot 460 to rotate between a plurality of discrete positions during the course of an orthodontic treatment. The rotational movement of the slot 460 may allow for different angles or locations of force on the tooth using the orthodontic arch wire 192 inserted therein. Additionally, the ability to move the slot 460 between a plurality of discrete positions may allow for a torque to be applied to the bracket assembly 400 and/or the tooth and/or allows for any other types of orthodontic adjustments required to move or adjust the tooth to a predetermined position.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. An orthodontic bracket assembly, comprising:
a mounting plate configured to be coupled to a tooth; and
a bracket member including a single tie-wing having a superior tie-wing portion extending in a superior direction, an inferior tie-wing portion extending in an inferior direction opposite to the superior direction, and a slot defined between planar side walls of the superior and inferior tie-wing portions and configured to receive a wire,
wherein each of the superior and inferior tie-wing portions includes a curved surface extending in a mesial-distal direction at a mesial end of the tie-wing portion and a curved surface extending in the mesial-distal direction at a distal end of the tie-wing portion and defining an entrance of the slot,
wherein a superior parabolic surface of the superior tie-wing portion extends from the respective planar side wall in a superior direction, and
wherein an inferior parabolic surface of the inferior tie-wing portion extends from the respective planar side wall in an inferior direction.

2. The orthodontic bracket assembly of claim 1, wherein the superior parabolic surface and the inferior parabolic surface are each defined by the equation $y=ax^2+bx+c$.

3. The orthodontic bracket assembly of claim 1, wherein:
the superior parabolic surface extends from the respective planar side wall to a superior apex,
the inferior parabolic surface extends from the respective planar side wall to an inferior apex,
wherein the superior apex and the inferior apex have the same height in the buccal direction.

4. The orthodontic bracket assembly of claim 3, wherein a distance between the superior apex and the inferior apex is approximately twice the distance between the planar side walls.

5. The orthodontic bracket assembly of claim 1, further comprising a support member positioned intermediate the mounting plate and the bracket member.

6. The orthodontic bracket assembly of claim 5, wherein the support member includes a plurality of tabs comprised of a flexible material and configured to contact the wire.

7. The orthodontic bracket assembly of claim 6, wherein a rear surface of the tabs is configured to contact a forward surface of the mounting plate.

8. The orthodontic bracket assembly of claim 6, wherein a rear surface of the tabs is spaced apart from a forward surface of the mounting plate.

9. The orthodontic bracket assembly of claim 5, wherein the support member is removably coupled to the mounting plate and the bracket member is removably coupled to the support member.

10. The orthodontic bracket assembly of claim 1, wherein the slot is configured to move between a plurality of discrete positions.

11. The orthodontic bracket assembly of claim 1, wherein the superior and inferior tie-wing portions are configured to receive a coupler extending between the superior and inferior tie-wing portions and positioned across a portion of the slot.

12. An orthodontic bracket assembly, comprising:
a mounting plate configured to be coupled with a tooth, the mounting plate including a plurality of protrusions and a plurality of grooves positioned between adjacent protrusions;
a support member rotatably coupled to the mounting plate and including a pair of flexible tabs, wherein each tab is configured to be selectively received in a groove, and
a bracket member having a slot configured to receive a wire, and the slot is configured to move between a plurality of discrete angular positions relative to the mounting plate by selectively positioning each of the pair of tabs in opposing grooves,
wherein the bracket member includes a single tie-wing having a superior tie-wing portion extending in a superior direction, an inferior tie-wing portion extending in an inferior direction opposite to the superior direction,
wherein the slot is defined between planar side walls of the superior and inferior tie-wing portions,
wherein each of the superior and inferior tie-wing portions includes a curved surface extending at a mesial end of the tie-wing portion and a distal end of the tie-wing portion and defining an entrance of the slot,
wherein a superior parabolic surface of the superior tie-wing portion extends from the respective planar side wall in a superior direction, and
wherein an inferior parabolic surface of the inferior tie-wing portion extends from the respective planar side wall in an inferior direction.

13. The orthodontic bracket assembly of claim 12, wherein the superior parabolic surface and the inferior parabolic surface are each defined by the equation $y=ax^2+bx+c$.

14. The orthodontic bracket assembly of claim 12, wherein:
the superior parabolic surface extends from the respective planar side wall to a superior apex,
the inferior parabolic surface extends from the respective planar side wall to an inferior apex,
wherein the superior apex and the inferior apex have the same height in the buccal direction.

15. The orthodontic bracket assembly of claim 14, wherein a distance between the superior apex and the inferior apex is approximately twice the distance between the planar side walls.

16. The orthodontic bracket assembly of claim 12, wherein the support member is removably coupled to the mounting plate and the bracket member is removably coupled to the support member.

17. The orthodontic bracket assembly of claim 12, wherein the superior and inferior tie-wing portions are configured to receive a coupler extending between the superior and inferior tie-wing portions and positioned across a portion of the slot.

\* \* \* \* \*